though a diagrammatic view of the test apparatus is shown.

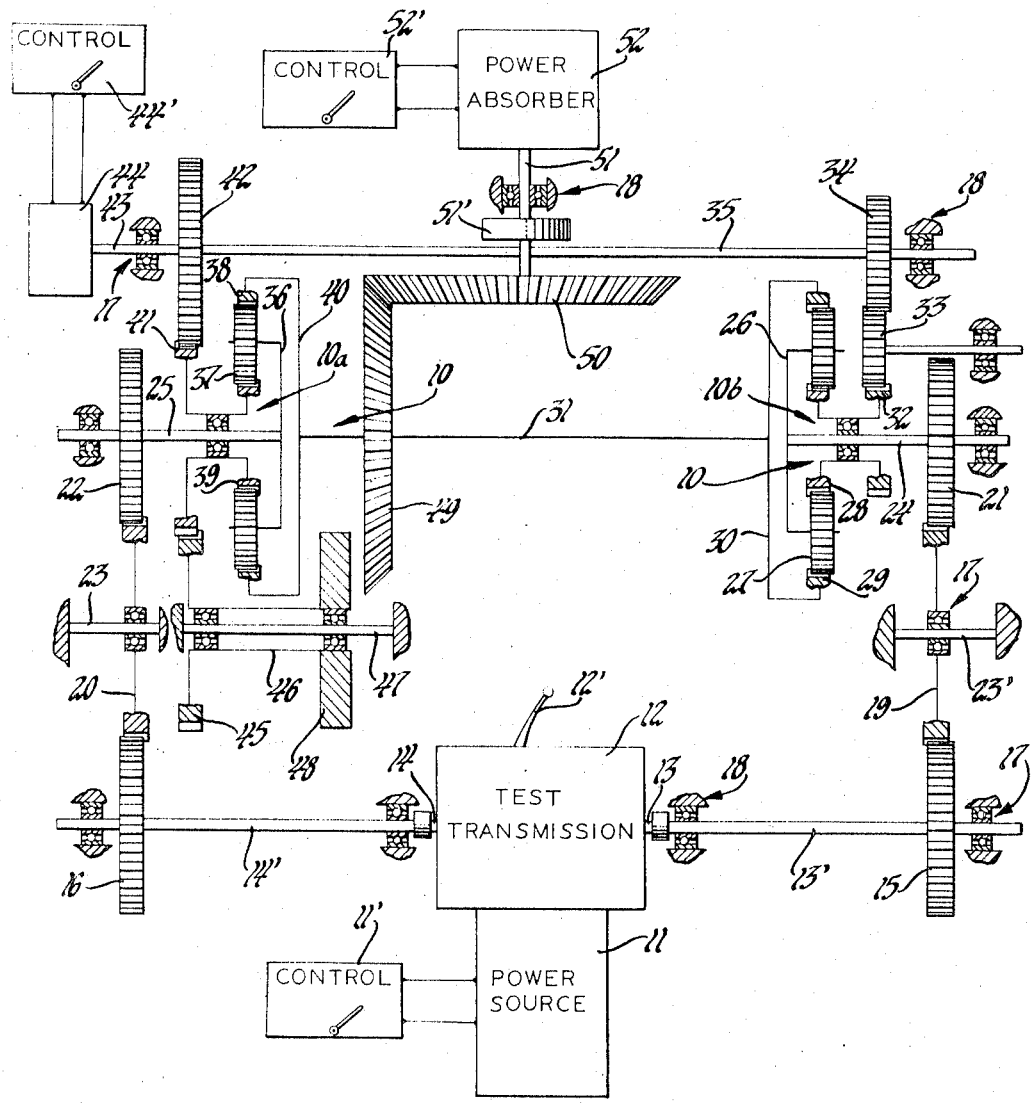

United States Patent Office 3,451,262
Patented June 24, 1969

3,451,262
CROSS DRIVE TRANSMISSION DYNAMOMETER
William T. McPeek, Danville, and Arthur E. Lynch, Brownsburg, Ind., assignors to General Motors Corporation, Detroit, Mich., a corporation of Delaware
Filed Aug. 2, 1967, Ser. No. 657,822
Int. Cl. G01m *13/02*
U.S. Cl. 73—118                                15 Claims

ABSTRACT OF THE DISCLOSURE

An extra-vehicular method of and apparatus for testing steering transmissions having dual output drive is disclosed wherein the power delivered by the transmission output shafts is apportioned, by means of differential gearing, between propulsion and steer power absorbing devices which are controlled to respectively simulate propulsion and steering power requirements and the inertia characteristics normally experienced in the operation of a vehicle.

---

This invention relates to a method of and apparatus for testing power transmissions, and more specifically relates to a method of and apparatus for extra-vehicular testing cross drive or dual output power transmissions. Cross drive transmissions transmit and control the power to propel the vehicle and to steer the vehicle. Steering is usually accomplished by rotating one driving wheel or track of the vehicle faster than the other driving wheel or track. Therefore, during a turning maneuver by the vehicle, one output shaft of the transmission is transmitting one amount of power at one speed while the other output shaft is transmitting another amount of power at a different speed. Also, during turning maneuvers, the steering inertia and straight ahead inertia must be considered in determining the power requirement of each output shaft. During straight ahead driving both shafts rotate at the same speed and transmit the same amount of power.

Because of these factors, cycling durability testing performed on transmissions had to be accomplished by field testing of the vehicle. This is a very time consuming method of testing and requires that sufficient vehicles be available to perform the test required. The present invention provides for extra-vehicular testing of cross drive power transmissions under conditions which simulate transient and dynamic effects of vehicle operation.

To accomplish extra-vehicular testing of a cross drive transmisison the test apparatus must be capable of discriminating between the input power to drive the vehicle and the input power to turn the vehicle. In the present invention this is achieved through the use of dual input differential epicyclic gearing having a rotatable reaction gear train. In this type of gearing, when the input speeds are not equal, the reaction gear train will rotate at a speed proportional to the difference in input speeds. By connecting the rotating reaction gear train to an output member, a signal proportional to input speed difference or vehicle turning rate is available. The normal output member of a differential epicyclic will rotate at a speed that is proportional to the average input speed or vehicle driving rate. Therefore, when the output members are coupled to power absorbing devices, the cross drive power transmission can be tested under various simulated vehicle driving and turning maneuvers.

An object of this invention is to provide a method of and apparatus for extra-vehicular testing of plural output power transmissions.

Another object of this invention is to provide an apparatus for extra-vehicular testing of plural output power transmission wherein the power required to drive and to steer a simulated vehicle can be varied independently.

A further object of the present invention is to provide an apparatus for durability testing a cross drive power transmission under various vehicle driving conditions without using an actual vehicle.

The exact nature of this invention as well as other objects and advantages thereof will be readily apparent from consideration of the following specification relating to the annexed drawing in which a diagrammatic view of the test apparatus is shown.

The drawing shows a power source 11, such as an electric motor, an internal combustion engine, a gas turbine or the like, having a control 11' coupled to a power transmission 12 to be tested, having a ratio control 12' and a differential epicyclic gearing generally designated 10 having planetary gear sets 10a and 10b. The power transmission has two output members 13 and 14, connected to jackshafts 13' and 14' which are drive connected through splines to input spur gears 15 and 16 respectively. The jackshafts 13' and 14' are rotatably supported by bearings generally shown as 17, in a suitable support, such as a housing, generally shown as 18. The input spur gears 15 and 16 are in mesh with idler gears 19 and 20, which are in mesh with driven gears 21 and 22. The idler gears are rotatably mounted on fixed shafts 23 and 23'. The driven gears 21 and 22 are drive connected by splines, keys or the like to input shafts 24, 25.

In the right gear set 10b, input shaft 24 is attached to pinion carrier 26 which carries rotatably mounted pinion gears 27. The pinion gears 27 mesh with sun gear 28 and ring gear 29. Ring gear 29 is attached to a drum 30 which is drive connected to an intermediate shaft 31. The sun gear 28 is secured to a reaction drive gear 32 which meshes with a reaction idler gear 33. The reaction idler gear 33 meshes with a reaction driven gear 34 which is secured to an intermediate shaft 35.

In the left gear set 10a, input shaft 25 is attached to a pinion carrier 36 which carries rotatably mounted pinion gears 37. Pinion gears 37 mesh with a ring gear 38 and a sun gear 39. Ring gear 38 is connected to drum 40 which is attached to an intermediate shaft 31. Sun gear 39 is secured to a reaction drive gear 41 which meshes with a reaction driven gear 42. The reaction driven gear 42 is secured to intermediate shaft 35. Intermediate shaft 35 has an extension 43 connected by a coupling or the like to a steer power absorbing device 44 having a control 44' such as a dynamometer or the like. Reaction drive gear 41 also meshes with a gear 45. The gear 45 is secured to a sleeve shaft 46 which is journalled on a fixed shaft 47. Fastened to the sleeve shaft 46 is a flywheel 48. It will be appreciated that the flywheel 48 may also be fastened to the shaft 43.

Secured to intermediate shaft 31 is a bevel gear 49 which meshes with another bevel gear 50. Bevel gear 50 is attached to an output shaft 51 which is coupled to a propulsion power absorbing and power delivering device 52 having a control 52', such as a dynamometer or the like.

From the foregoing description it is obvious that ring gears 29 and 38 will rotate in the same direction at the same speed. The sun gears 28 and 39 will rotate in opposite directions and at equal speeds, since the speed ratio of gears 41 and 42 is equal to the speed ratio of gears 32 and 34. The sun gears 38 and 39 may also remain stationary.

The inertia of the vehicle about is polar axis is simulated by the flywheel 48, gears 34, 42 and 45, shaft 43 and power absorbing device 44. The gears 28, 32, 33, 39 and 41 and shafts 35 and 46 also have some effect on this inertia but it is small in comparison to the other components. The flywheel 48 may be varied in size and weight so that the polar moment of inertia of a vehicle may be closely simulated. This inertia load simulates the turning or steering inertia of the vehicle. The translational inertia of the vehicle is simulated by the inertia of the propulsion power absorbing device 52, the ring gears 29 and 38, and the drums 30 and 40, the bevel gears 49 and 50 and the shafts 31 and 51. If the inertia of these components is not sufficient, a flywheel 51' may be added to the output shaft 51. Also, the simulated inertia loads of either driving, steering or both may be changed by increasing or decreasing the various speed ratios of the gearing in the test apparatus. The inertia of the gears 15, 16, 19, 20, 21 and 22, carriers 26 and 36, pinion gears 27 and 37 and shafts 13', 14', 23, 23', 24 and 25 are to approximate the inertia of rotating propulsion components, such as drive wheel, idler wheels and tracks of the vehicle which rotate during propulsion.

Actual vehicle inertias will change during a field test due to such factors as a change in the amount of fuel carried by the vehicle or wear on components, thus the inertias assigned for test are theoretical values for a given vehicle within a working range.

The power absorbed by the propulsion power absorbing device 52 represents the power expended by the vehicle's power plant in overcoming the resistance to straight ahead driving. The power absorber by the steer power absorbing device 44 represents the power expended by the vehicle's power plant in overcoming the resistance to steering or turning the vehicle.

The power absorbing devices 44 and 52 through controls 44' and 52' as well as the power source 11 through controls 11' and the test transmission 12 through its control 12' may be controlled automatically by an integrated control system, not shown. The control system may be of a very complex nature such as that described in the Society of Automotive Engineers paper by F. Blair, Jr. entitled Laboratory Durability Testing Heavy Duty Powershift Transmissions Under Simulated Field Conditions. The complexity of the control system will depend on the number and variety of events which occur during the simulated duty cycle.

When the power transmission 12 is being tested in the straight ahead driving condition, the jackshafts 13' and 14' rotate at the same speed and in the same direction and transmit an equal amount of power. The gear ratios between jackshafts 13' and 14' and input shafts 24 and 25 are the same. Therefore, the speed of the pinion carriers 26 and 36 are equal, and an equal amount of power is transmitted to each of them. The power is transmitted from the pinion carriers 26 and 36 through their respective pinion gears and ring gears to the intermediate shaft 31 where the input power is combined. From intermediate shaft 31 the power is transmitted through the bevel gear 49, the bevel gear 50 and the output shaft 51 to the propulsion power absorbing device 52. The sun gears 28 and 39 provide reaction for the carrier drive of the ring gears 29 and 38 by virtue of their equal and opposite geared connection to shaft 35. The actual drive reaction is taken in the shaft 35 since the gears 42 and 34 impose equal and opposite torques on that portion of shaft 35 intermediate the attachment of gears 42 and 34. Since there is no resultant turning moment on shaft 35, shaft 35 remains stationary as do sun gears 39 and 28. Thus, the steer power absorbing device 44 has no duty during straight ahead drive.

When the transmission 12 is caused to simulate a right steer condition by operation of control 12' the jack shaft 14' will be caused to rotate more rapidly than shaft 13'. By virtue the equal ratio gearing previously described between 14' and 13' and carriers 36 and 26 respectively, the carrier 36 will be caused to rotate faster than carrier 26 in the same proportion as the different speeds of the jackshafts.

The ring gears 38 and 29 are connected to common shaft 31 thus they must rotate at the same speed. The different speeds of carriers 36 and 26 in planet sets 10a and 10b must therefore be accommodated by differential rotation of sun gears 39 and 28 which causes shaft 35 to rotate. Thus the inputs 51 and 43 to power absorbing devices 52 and 44 will be caused to rotate. The controls 52' and 44' are adjusted to cause propulsion and steer bias to be imposed on the test transmission according to the data received from field test for the instant steer and propulsion requirements of the vehicle.

When the transmission 12 is caused to simulate a left steer condition by operation of control 12' the jackshaft 13' will be caused to rotate more rapidly than shaft 14'. By virtue the equal ratio gearing previously described between 14' and 13' and carriers 36 and 26 respectively, the carrier 26 will be caused to rotate faster than carrier 36 in the same proportion as the different speeds of the jackshafts.

The ring gears 38 and 29 are connected to common shaft 31 thus they must rotate at the same speed. The different speeds of carriers 36 and 26 in planet sets 10a and 10b must therefore be accommodated by differential rotation of sun gears 39 and 28 which causes shaft 35 to rotate. Thus the inputs 51 and 43 to power absorbing devices 52 and 44 will be caused totate. The controls 52' and 44' are adjusted to cause propulsion and steer bias to be imposed on the test transmission according to the data received from field test for the instant steer and propulsion requirements of the vehicle.

If the test transmission 12 is conditioned for a pivot steer, all the power will be transmitted from the transmission output members 13 and 14 to the steer power absorbing device 44 in the following manner. The output members 13 and 14 rotate in opposite direction thereby driving the pinion carriers 26 and 36 in opposite directions. The ring gears 29 and 38 are held stationary because the planetary gear action attempts to rotate the ring gears 29 and 38 in opposite directions thus the propulsion power absorbing device 52 does not rotate. The sun gears 28 and 39 are driven in opposite directions by their respective pinion carriers. The reaction drive gears 32 and 41, which are secured to the sun gears 28 and 39 respectively, rotate in opposite directions, however, the reaction driven gears 34 and 42 rotate in the same direction due to the reversing influence of the reaction idler gear 33 on reaction driven gear 34. The steer power absorbing device 44 is rotated by the intermediate shaft 35, which has the reaction driven gears 34 and 42 secured thereto, and the extension 43.

During downhill operation, the effect of gravity is simulated by supplying power from dynamometer 52 through the test apparatus to the transmission 12 while the power source 11 or vehicle brakes, not shown, in the transmission 12 operate as power absorbing devices.

Thus extra-vehicular testing of cross drive transmissions under simulated vehicle drive conditions may be accomplished. This eliminates the use of an expensive vehicle and reduces overall test time since the test will not be hampered or interrupted by vehicle malfunctions such as engine failure and fatigue failure of other components of the vehicle.

Many variations of the present invention are possible in view of the above teachings. It is therefore understood that within the scope of the appended claims, the invention may be practiced otherwise than as specifically described.

What is claimed is:

1. In a machine for testing a power transmission having a first power output member and a second power output member; the combination including first and second input means operatively connectable respectively to said first power output member and said second power output member for receiving input power therefrom; torque dividing gear means having a first input member and a second input member respectively drive connected to said first input means and said second input means, output gear means drive connected to said input members for transmitting a propulsion portion of said input power and reaction gear means reversely drive connected between said input members for providing a reversing reaction drive between said input members for transmitting a steer portion of said input power, said torque dividing gear means being operable for dividing the input power to said input members between said output gear means and said reaction gear means to simulate vehicle propulsion and steer efforts respectively; first power absorbing means drive connected to said output gear means for absorbing the propulsion portion of said input power; and second power absorbing means drive connected to said reaction gear means for absorbing the steer portion.

2. The invention defined in claim 1 and said output gear means and said first power absorbing means having a moment of inertia simulating inertial resistance of a vehicle to straight vehicle propulsion; and said reaction gear means and said second power absorbing means having a moment of inertia simulating inertial resistance of the vehicle to vehicle turning.

3. The invention defined in claim 1 and said first power absorbing means having control means for simulating variable resistance to vehicle propulsion; and said second power absorbing means having control means for simulating variable resistance to vehicle steer.

4. The invention defined in claim 1 and said first power absorbing means being a dynamometer operative to selectively supply power to said output gear means and absorb power from said output gear means.

5. The invention defined in claim 4 and said first power absorbing means having control means for simulating variable resistance to vehicle propulsion; said second power absorbing means having control means for simulating variable resistance to vehicle steer; said output gear means and said first power absorbing means having a moment of inertia simulating inertial resistance of a vehicle to straight vehicle propulsion; and said reaction gear means and said second power absorbing means having a moment of inertia simulating inertial resistance of the vehicle to vehicle turning.

6. In a machine, for use in testing a power transmission device having a pair of power output members, the combination comprising first and second power absorbing devices for simulating vehicle propulsion and steering effort, a pair of input means each operatively connected to a power output member for receiving an input power therefrom, a pair of gearing means each having an input element drive connected to an input means, a reaction element drive connected to the input element and an output element drive connected to the input element, first power transmitting means for operatively drive connecting and transmitting power from said output elements, second power transmitting means for operatively drive connecting and transmitting power from said reaction elements, first drive means for operatively connecting said first power transmitting means to said first power absorbing device for transmitting power to said first power absorbing device, and second drive means for operatively connecting said second power transmitting means to said second power absorbing device for transmitting power to said second power absorbing device, said gearing means being operable to divide input power from said power output members between said first and second power absorbing devices to simulate resistance to vehicle propulsion and steering.

7. The invention defined in claim 6 and said first power transmitting means having a reverse drive connection between said reaction elements; said first power absorbing means having adjustable control means for simulating resistance to vehicle propulsion; and said second power absorbing means having adjustable control means for simulating resistance to vehicle steering.

8. The invention defined in claim 6 and said first power absorbing device being a dynamometer operative to selectively supply power to said second drive means and absorb power for said second drive means.

9. The invention defined in claim 7 and said output elements, said first power transmitting means, said first drive means and said first power absorbing device having a moment of inertia simulating inertial resistance of a vehicle to straight vehicle propulsion and said reaction elements, said second power transmitting means, said second drive means and said second power absorbing device having a moment of inertia simulating inertial resistance of the vehicle to vehicle turning.

10. In a machine for use in testing a power transmission having a pair of power output members and being operable to establish various drive conditions, including equal and differential power output between said output members, the combination including a pair of input means each operatively connected to a power output member for receiving an input power therefrom; a pair of gear means each having an input member drive connected to an input means, an output element and a reaction member; first power absorbing means controllable for simulating a load reflecting equal and differential power output drive conditions operatively connected to said output elements; second power absorbing means controllable for simulating a load reflecting a differential power output drive condition operatively connected to said reaction members; and said gear means being operable to divide the input power from said power output members between said first and second power absorbing means in accordance with the established transmission drive conditions.

11. The invention defined in claim 10 and said second power absorbing means being connected directly to one reaction member and reversely to another reaction member and providing a reversing drive transmitting connection between reaction members.

12. The invention defined in claim 12 and said reaction members and second power absorbing means having a moment of inertia simulating inertial resistance of a vehicle to vehicle turning during a differential power output drive condition and said output members and first power absorbing means having a moment of inertia simulating inertial resistance of the vehicle to straight vehicle propulsion during equal and differential power output drive conditions.

13. In a cross drive power transmission test apparatus the combination comprising a first input gear, a second input gear, means for connecting the first and second input gears to the transmission to be tested, a first idler gear rotatably mounted on a stationary shaft and meshing with said first input gear, a second idler gear rotatably mounted on a stationary shaft and meshing with said second input gear, a first drive gear meshing with said first idler gear, a second drive gear meshing with said second idler gear, a first planetary gear set having a sun gear, a ring gear and a carrier having mounted thereon a plurality of rotatable pinions meshing with said sun gear and ring gear, means for operatively connecting said carrier to said first drive gear, a second planetary gear set having a sun gear, a ring gear and a carrier having mounted thereon a plurality of rotatable pinions meshing with said sun gear and said ring gear, means for operatively connecting said carrier to said second drive gear, means for operatively connecting said ring gear of the first planetary gear set to the ring gear of the second planetary gear set, a first bevel gear drivingly attached to said last mentioned means, a second bevel gear meshing with said first bevel gear and being drivingly connected to a first output shaft, a first power absorbing means operatively connected to said first output shaft, a third drive gear secured to the sun gear of said first planetary gear set and meshing with a first driven gear, a fourth drive gear secured to the sun gear of said second planetary gear set and meshing with a third idler gear, a second driven gear meshing with the third idler gear, means for drive connecting the first and second driven gears to a second output shaft, a second power absorbing device operatively connected to said second output shaft, said first and second planetary gear sets being operable to apportion input power between said first and second power absorbing devices.

14. A method of testing cross drive power transmissions having input means and dual output shafts under simulated vehicle operating conditions comprising: transmitting power to the input means of the power transmission from an external power source; transmitting power from the output shafts of the power transmission to a differential epicyclic gearing having plural input and output members; transmitting a portion of the power from one output member to a propulsion power absorbing means; transmitting a portion of the power from another output member to a steer power absorbing means; varying the power absorbing characteristics of the propulsion and steer power absorbing means to simulate various vehicle operating conditions.

15. A method of extra-vehicular testing of cross drive transmissions having input means and dual output shafts under simulated vehicle operating conditions comprising: controlling the power level of an external power source; transmitting the controlled power to the input means of the power transmission; controlling the transmission to selectively simulate vehicle condition of straight ahead propulsion, turning and propulsion and pivot turning to proportion the controlled power between the output shafts; transmitting the power from the output shafts to a differential epicyclic gearing having plural input and output members; transmitting from one of said output members to a propulsion power absorbing means a portion of the power when the transmission is selectively controlled to simulate turning and propulsion, all of the power when the transmission is selectively controlled to simulate straight ahead propulsion and none of the power when the transmission is selectively controlled to simulate pivot turning; transmitting from another of said output members to a steer power absorbing means a portion of the power when the transmission is selectively controlled to simulate turning and propulsion, none of the power when the transmission is selectively controlled to simulate straight ahead propulsion and all of the power when the transmission is selectively controlled to simulate pivot turning; and controlling the power absorbing characteristics of the propulsion and steer power absorbing means to simulate resistance to various vehicle operating conditions.

References Cited

UNITED STATES PATENTS

| | | | |
|---|---|---|---|
| 2,981,103 | 4/1961 | Livezeg | 73—118 X |
| 3,152,468 | 10/1964 | Powell. | |
| 3,298,228 | 1/1967 | Oltean et al. | 73—118 X |

RICHARD C. QUEISSER, *Primary Examiner.*

JERRY W. MYRACLE, *Assistant Examiner.*

U.S. Cl. X.R.

73—162

PO-1050
(5/69)

UNITED STATES PATENT OFFICE
CERTIFICATE OF CORRECTION

Patent No. 3,451,262          Dated June 24, 1969

Inventor(s) William T. McPeek and Arthur E. Lynch

It is certified that error appears in the above-identified patent and that said Letters Patent are hereby corrected as shown below:

Column 2, line 67, "is", first occurrence, should read -- its
Column 4, line 25, "totate" should read -- to rotate --
Column 6, line 37, "defined in claim 12" should read --
defined in claim 11 --

SIGNED AND
SEALED

DEC 2 - 1969

(SEAL)
Attest:

Edward M. Fletcher, Jr.
Attesting Officer

WILLIAM E. SCHUYLER,
Commissioner of Pate